United States Patent [19]

Miller et al.

[11] Patent Number: 5,518,754
[45] Date of Patent: May 21, 1996

[54] CHOCOLATE PRODUCTS WITH SUCROSE FATTY ACID POLYESTER FAT SUBSTITUTES

[75] Inventors: Mark S. Miller, Arlington Heights; Kevin J. Surber, Lombard, both of Ill.

[73] Assignee: Kraft Foods, Inc., Northfield, Ill.

[21] Appl. No.: 293,393

[22] Filed: Aug. 19, 1994

[51] Int. Cl.$^6$ ............................................. A23D 7/005
[52] U.S. Cl. ................................ 426/611; 426/660; 426/804
[58] Field of Search .................................. 426/804, 611, 426/660

[56] References Cited

U.S. PATENT DOCUMENTS

| | | | |
|---|---|---|---|
| 3,597,417 | 3/1971 | Myhre . | |
| 4,810,516 | 3/1989 | Kong-Chan | 426/548 |
| 4,822,875 | 4/1989 | McCoy et al. | 536/119 |
| 4,837,041 | 6/1989 | Maruzeni | 426/611 |
| 4,847,105 | 7/1989 | Yokobori | 426/611 |
| 4,888,196 | 12/1989 | Ehrman et al. | 426/601 |
| 4,897,474 | 1/1990 | Bickert . | |
| 5,023,106 | 6/1991 | Ehrman et al. | 426/660 |
| 5,066,510 | 11/1991 | Ehrman et al. | 426/607 |
| 5,071,669 | 8/1990 | Seiden | 426/660 |

FOREIGN PATENT DOCUMENTS

| | | |
|---|---|---|
| 37053189 | 1/1990 | Australia . |
| 5970690 | 1/1991 | Australia . |
| A0062565 | 10/1982 | European Pat. Off. . |
| A0252250 | 1/1988 | European Pat. Off. . |
| A0311154 | 12/1989 | European Pat. Off. . |
| 0350981A1 | 1/1990 | European Pat. Off. . |
| 0377237A2 | 7/1990 | European Pat. Off. . |
| 0378876A2 | 7/1990 | European Pat. Off. . |
| 0410506A2 | 1/1991 | European Pat. Off. . |
| 0410507A2 | 1/1991 | European Pat. Off. . |
| 0416665A2 | 3/1991 | European Pat. Off. . |
| WO92/00947 | 1/1992 | WIPO . |

OTHER PUBLICATIONS

Bailey, "Bailey's Industrial Oil & at Products", 1964, pp. 958–972.

Primary Examiner—Carolyn Paden
Attorney, Agent, or Firm—Fitch, Even, Tabin & Flannery

[57] ABSTRACT

Low-fat or reduced-fat chocolate products containing sucrose fatty acid polyesters are provided which have texture and mouthfeel properties similar to conventional chocolate products. These chocolate products are prepared using a sucrose fatty acid polyester or a blend of sucrose fatty acid polyesters in place of the conventional cocoa butter constituent. The sucrose fatty acid polyesters used do not necessarily mimic the theological and thermal properties of cocoa butter. Rather, the desired texture and mouthfeel properties of the chocolate products of this invention are obtained by incorporating a hydrogenated or hardened oil (i.e., a hardstock triglyceride) and an emulsifier selected from the group consisting of lactylated glycerides, sorbitan esters, acetylated glycerides, polysorbate esters, and polyglycerol esters, along with the one or more sucrose fatty acid polyesters, into conventional chocolate formulations containing essentially no cocoa butter or substantially reduced levels of cocoa butter. In one especially preferred embodiment, two sucrose fatty acid polyesters of different firmness and having high levels of sucrose fatty acid octaesters are employed. The improved chocolate products have similar texture and mouthfeel properties of conventional chocolate with significantly fewer calories and lower fat content. Moreover, the texture and mouthfeel properties can be varied for various uses by varying the relative proportions of the sucrose fatty acid polyesters and the hardened oil.

14 Claims, No Drawings

5,518,754

CHOCOLATE PRODUCTS WITH SUCROSE FATTY ACID POLYESTER FAT SUBSTITUTES

FIELD OF THE INVENTION

The invention generally relates to the field of chocolate products, especially low-fat or reduced-fat chocolate products. More specifically, this invention relates to low-fat or reduced-fat chocolate products having texture and mouth-feel similar to conventional chocolate products. The chocolate products of this invention are prepared using a sucrose fatty acid polyester or a blend of sucrose fatty acid polyesters in place of the conventional cocoa butter constituent.

BACKGROUND OF THE INVENTION

Chocolate is a highly desirable confection product which has unique texture and flavor release properties in the mouth. Many of these desirable properties are generally attributable to the fat component of chocolate—cocoa butter—which has a narrow melting point range just slightly below normal body temperature and a sharp melting curve. Accordingly, the desirable flavor release and organoleptic sensations of chocolate occur rapidly as the chocolate melts in the mouth.

Conventional chocolate products generally contain about 30 to 60 percent sugar, about 10 to 70 percent chocolate liquor (which normally contains about percent cocoa butter), about 20 to 25 percent added cocoa butter, and about 1 percent flavor and other constituents. Typically, such chocolate products contain about 30 to 34 percent total fat in the form of cocoa butter. Unfortunately, therefore, conventional chocolate products are generally high in undesirable saturated fats and calories. Due to the relatively recent interest in reducing calorie and saturated fat intake in the diet, there has been an increased interest in providing reduced-calorie and/or reduced-fat chocolate products. Most of these efforts have attempted to provide a substitute for the cocoa butter component in conventional chocolate products.

For example, U.S. Pat. No. 4,810,516 (Mar. 7, 1989) provided a low-calorie, low-fat chocolate product containing an artificial sweetener, a bulking agent, and a cocoa butter substitute. The cocoa butter substitute consisted of a non-digestible fatty polyester or polyether having the approximate melting properties of cocoa butter. Specifically, the cocoa butter substitute was required to have a melting temperature of 30° to 36° C. and a solids content index of at least 66 at a temperature of 6.6° C. below its clear melting point. One example of a suitable cocoa butter substitute was a sucrose esterification product having myristate and laurate fatty acid ester groups in a molar ratio of about 5:3 and a degree of esterification of 7.5 or higher. U.S. Pat. No. 4,822,875 (Apr. 18, 1989) provided a cocoa butter substitute comprising sucrose fatty acid esters having at least four fatty acid ester groups wherein the fatty acid groups consisted of about 25 to 50 percent lauric acid, from about 50 to 75 percent palmitic acid, and up to about 5 percent of other fatty acids. Thus, in order to achieve the required melting properties (i.e., mimicking cocoa butter), these cocoa butter substitutes had to be controlled very carefully as to the types of fatty acids, their ratios, and the overall degree of esterification. As can be seen from these patents, only a few specific sucrose fatty acid esters were suitable for use as cocoa butter substitutes in chocolate products.

European Patent Publications 350,981 A1 (published Jan. 1, 1990) provides a hard-fat substitute for chocolate confectionery products. This hard-fat substitute consisted of an indigestible polyol fatty acid polyester wherein the fatty acid resides were derived from certain substantially fully hardened vegetable oils. The fatty acid residues were selected to achieve the desired melting characteristics and preferably were derived from fully hardened palm oil, palm kernel oil, and coconut oil. European Patent Publication 377,237 A2 (published Jul. 11, 1990) relates to confectionery products containing indigestible polyol fatty acid polyesters wherein at least 60 percent of the fatty acid residues consist of lauric and/or stearic acids. It is reported that the use of lauric and stearic acid residues allows for processing advantages without adversely effecting the required melting profiles. European Patent Publication 378,876 A2 (published Jul. 25, 1990) provides a fat substitute consisting of an indigestible polyol fatty acid polyester wherein the fatty acid consisted of at least 30 percent of trans-hardened unsaturated fatty acids, especially trans-hardened oleic acid. The incorporation of the trans-hardened unsaturated fatty acid is said to allow a greater compositional flexibility in regard to suitable fatty acid groups without an adverse effect upon the melting profile. European Patent Publication 410,506 A2 (published Jan. 30, 1991) relates to polyol fatty acid polyesters, defined in terms of their melting profiles, which are suitable for use in chewy confectionery products. European Patent Publication 410,507 A2 (published Jan. 30, 1991) relates to the use of polyol fatty acid polyesters in aerated or whipped products, including chocolate. Once again, suitable polyol fatty acid polyesters are selected and identified in terms of their melting characteristics. European Patent Publication 416, 665 A2 (published Mar. 13, 1991) relates to the use polyol fatty acid polyesters, also defined in terms of melting characteristics, for use in soft confectionery products. Thus, it is still apparent from these just-listed publications that suitable polyol fatty acid polyesters suitable for use as cocoa butter substitutes in chocolate products must be carefully selected based on their melting characteristics. The requirement to mimic, or at least approximate, the melting characteristics of cocoa butter significantly impacts the ability to use such polyesters in confectionery products.

U.S. Pat. No. 4,888,196 (Dec. 19, 1989), U.S. Pat. No. 5,023,106 (Jun. 11, 1991), U.S. Pat. No. 5,066,510 (Nov. 19, 1991) , and U.S. Pat. No. 5,071,669 (Dec. 10, 1991) generally relate to the use of mixtures of certain triglycerides in confectionery products. These triglycerides have certain ratios of medium chain saturated fatty acid residues (generally to $C_{10}$) and long chain saturated fatty acid residues (generally $C_{20}$ to $C_{24}$) in the three ester positions in order to obtain the desired melting and organoleptic properties. U.S. Pat. No. 5,071,669 was directed towards the use of blends of these or similar triglycerides with nondigestible polyol polyesters in various food products, including chocolate products. The polyol polyesters used can be either liquid or solid at body temperature.

It would be desirable, therefore, to provide additional chocolate products and additional cocoa butter substitutes having low or reduced fat content which maintain the texture and flavor characteristics of conventional chocolate products. It would also be desirable to provide chocolate products containing sucrose fatty acid polyesters which are not required to mimic the rheological and thermal properties of cocoa butter. The compositions of this invention generally provide such low-fat or reduced-fat chocolate products having such characteristics.

SUMMARY OF THE INVENTION

The present invention relates to chocolate products, especially low-fat or reduced-fat chocolate products containing sucrose fatty acid polyesters in place of all or some of the cocoa butter normally used in chocolate products. The chocolate products of the present invention have texture and mouthfeel similar to conventional chocolate products. The sucrose fatty acid polyesters used do not necessarily mimic the rheological and thermal properties of cocoa butter. Rather, the desired texture and mouthfeel properties of the chocolate products of this invention are obtained by blending one or more sucrose fatty acid polyesters with a hardened oil (i.e., hardstock triglycerides), lecithin, and a second emulsifier such as lactylated glycerides, sorbitan esters, acetylated glycerides, polysorbate esters, and polyglycerol esters, into chocolate formulations containing essentially no cocoa butter or significantly reduced levels of cocoa butter. In one especially preferred embodiment, two or more sucrose fatty acid polyesters of different firmness and having high levels of sucrose fatty acid octaesters are employed. The improved chocolate products of the present invention have texture and mouthfeel properties similar to conventional chocolate with significantly fewer calories and lower fat content. Furthermore, the texture and mouthfeel properties can be varied for various uses by varying the relative proportions of the sucrose fatty acid polyesters and hydrogenated oil.

One object of the present invention is to provide a reduced-fat chocolate product comprising sugar or an artificial sweetener, a cocoa source, a sucrose fatty acid polyester, a hydrogenated oil, lecithin, milk powder, and an emulsifier selected from the group consisting of lactylated glycerides, sorbitan esters, acetylated glycerides, polysorbate esters, and polyglycerol esters, wherein the relative amounts of the sucrose fatty acid polyester and the hydrogenated oil are such that the product has chocolate-like texture and mouthfeel.

Another object of the present invention is to provide a reduced-fat chocolate product containing about 25 to 35 weight percent oleaginous components, said product comprising:

(1) about 5 to 20 weight percent of a cocoa source selected from the group consisting of cocoa powder and chocolate liquor;

(2) 0 to about 20 weight percent milk powder;

(3) about 35 to 55 weight percent sugar or artificial sweetener with a bulking agent;

(4) 0 to about 35 weight percent of a first sucrose fatty acid polyester;

(5) 0 to about 35 weight percent of a second sucrose fatty acid polyester;

(6) about 0.2 to 1.0 weight percent lecithin;

(7) about 0.5 to 3 weight percent of a hydrogenated oil; and (8) about 0.1 to 1.5 weight percent of an emulsifier selected from the group consisting of lactylated glycerides, sorbitan esters, acetylated glycerides, polysorbate esters, and polyglycerol esters;

wherein the total amount of the first and second sucrose fatty acid polyesters is in the range of about 10 to 35 weight percent and wherein the product has mouthfeel, texture, firmness, and snap similar to conventional chocolate products containing cocoa butter.

These and other objects and advantages will be apparent from a consideration of the present specification.

DETAILED DESCRIPTION OF THE INVENTION

The compositions of the invention are prepared, as detailed below, from sugar or an artificial sweetener, a cocoa source, at least one sucrose fatty acid polyester, a hydrogenated oil, lecithin, an emulsifier selected from the group consisting of lactylated glycerides, sorbitan esters, acetylated glycerides, polysorbate esters, and polyglycerol esters, and milk powder. Additionally, flavor or similar ingredients can also be incorporated therein. These compositions contain two different emulsifiers. Lecithin, the first emulsifier used in the present composition, is normally the only emulsifier used in conventional chocolate products. The second emulsifier used in the present composition is a lactylated glyceride, a sorbitan ester, an acetylated glyceride, a polysorbate ester, a polyglycerol ester, or mixtures thereof. Both the first and second emulsifiers are necessary in the compositions of this invention.

By varying the relative concentrations of ingredients, the compositions of the present invention can be prepared with textural and mouthfeel properties similar to conventional chocolate products. Moreover, it is not necessary that the sucrose fatty acid polyesters used in this present invention closely mimic the melting characteristics of cocoa butter to achieve such texture and mouthfeel properties.

In one preferred embodiment, the chocolate products of this invention contain about 25 to 35 weight percent oleaginous components. More preferably, these chocolate products contain about 29 to 31.5 weight percent oleaginous components. For purposes of this invention, the oleaginous components include the sucrose fatty acid polyesters, fats, and emulsifiers. Fats are generally found in a number of components, including the cocoa source and hydrogenated oil. Suitable cocoa sources include chocolate liquor and cocoa powder. If desired, additional cocoa butter, as a separate component, can be used in the present formulations. If used, however, the level of such cocoa butter should be kept relatively low so as not to significantly increase the fat content. If used, the level of such additional cocoa butter is preferably less than about 12 percent, and most preferably less than about 2 percent. Generally, the upper limit for total solid fat (as measured at body temperature) derived from the sucrose fatty acid polyester and the hydrogenated oil is about 10 percent of the total oleaginous content. Above this limit, waxiness generally become objectionable.

Preferably, the low- or reduced-fat chocolate products of this invention contain (1) about 5 to 20 weight percent of a cocoa source selected from the group consisting of cocoa powder and chocolate liquor; (2) 0 to about 20 weight percent milk powder; (3) about 35 to 55 weight percent sugar or artificial sweetener with a bulking agent; (4) 0 to about 35 weight percent of a first sucrose fatty acid polyester; (5) 0 to about 35 weight percent of a second sucrose fatty acid polyester; (6) about 0.2 to 1.0 weight percent lecithin; (7) about 0.5 to 3 weight percent of a hydrogenated oil; and (8) about 0.1 to 1.5 weight percent of an emulsifier selected from the group consisting of lactylated glycerides, sorbitan esters, acetylated glycerides, polysorbate esters, and polyglycerol esters, wherein the total amount of the first and second sucrose fatty acid polyesters is in the range of about 10 to 35 weight percent.

More preferably, the compositions of this invention contain (1) about 8 to 14 weight percent of a cocoa source selected from the group consisting of cocoa powder and chocolate liquor; (2) about 12 to 15 weight percent milk powder; (3) about 47 to 52 weight percent sugar or artificial sweetener with a bulking agent; (4) about 10 to 15 weight percent of a first sucrose fatty acid polyester; (5) about 10 to 15 weight percent of a second sucrose fatty acid polyester; (6) about 0.25 to 0.5 weight percent lecithin; (7) about 1.5 to 2.5 weight percent of a hydrogenated oil; and (8) about 0.75 to 1.0 weight percent of an emulsifier selected from the group consisting of lactylated glycerides and sorbitan esters. The relative proportions of the ingredients of the chocolate products of this invention, especially the sucrose fatty acid polyesters and the hydrogenated oil are adjusted to obtain mouthfeel, texture, firmness, and snap similar to conventional chocolate products containing significant levels of added cocoa butter.

The compositions of this invention contain about 5 to 20 percent of a cocoa source, preferably about 8 to 14 percent. The cocoa source is generally cocoa powder or chocolate liquor derived in the conventional manner from cocoa beans. Commercial chocolate liquor normally contains about 50 percent cocoa butter. Chocolate liquors having lower levels of cocoa butter can also be used. The preferred cocoa source is cocoa powder since the cocoa butter level can be varied over a considerable range, thus making it possible to produce a chocolate product having even less fat content. Commercial cocoa powders normally contain about 10 to 24 percent cocoa butter. Cocoa powders having even less cocoa butter can also be used, including partially defatted cocoa powders containing between about 1 and 10 percent cocoa butter and fully defatted cocoa powders containing less than about 1 percent cocoa butter.

The compositions of this invention also contain 0 to about 20 percent milk powder. For milk chocolate products, the milk powder is preferably present at about 12 to 15 percent. Commercially available milk powders can be used in the present compositions. Preferably the milk powder, if used, is a non-fat or reduced-fat milk powder. Of course, milk powder is not required for dark chocolate products.

Sugar or artificial sweeteners with bulking agents are present in the compositions of the present invention at a level of about 35 to 55 percent, preferably about 47 to 52 percent. For purpose of this invention, the sugar can be a suitable nutritive sweetener, including, for example, sucrose, glucose, corn syrup, and high fructose corn syrup. The preferred sugar is sucrose. Other nutritive sweeteners can be used at equivalent levels to sucrose or as a substitute for a portion of the sucrose. The sugar may be granular cane or beet sugar. For some applications, a portion of the sugar may be powdered confectioners sugar. Powdered confectioners sugar, when used, is generally at a level of about 48 to 50 percent. Artificial or non-nutritive sweeteners such as aspartame, Sucralose™, or Alitame™ may be used in combination with a bulking agent such as polydextrose. Other sweeteners, such as D-tagatose or various polyols (e.g., sorbitol or xylitol) can be used with or without bulking agents to substitute for all or part of the sugar. A polydextrose may optionally be used in the compositions of the present invention in place of sugar if desired. Polydextrose can be prepared by the polymerization of glucose in the presence of food-acceptable polycarboxylic acid catalysts and polyols as provided in, for example, U.S. Pat. No. 4,622,233, which is hereby incorporated by reference. Polydextrose can be used to replace all or part of the sugar, in which case the sweetening effect of the displaced sugar can be provided by a non-nutritive sweetener. Polydextrose, if used, is normally at levels up to about 25 percent with the remainder of the bulk being replaced by other polyols. For purposes of this invention, "sugar" is to include any suitable nutritive sweetener, or mixtures thereof, and "artificial sweeteners" is to include any suitable non-nutritive sweetener, or mixtures thereof, including those listed above.

The compositions of this invention also contain at least one sucrose fatty acid polyester. Preferably, the compositions of this invention contain a blend of at least two sucrose fatty acid polyesters having different firmness and melting profiles. Preferably the first sucrose fatty acid polyesters has a solid fat content (SFC) of about 20 to 50 percent at 20° C. and about 0 to 3 percent at 37° C. and the second sucrose fatty acid polyesters has a SFC of about 40 to 70 percent at 20° C. and about 3 to 12 percent at 37° C. More preferably the first sucrose fatty acid polyesters has a SFC of about 30 to 40 percent at 20° C. and about 0 to 2 percent at 37° C. and the second sucrose fatty acid polyesters has a SFC of about 50 to 60 percent at 20° C. and about 8 to 10 percent at 37° C. By varying the relative ratios of such sucrose fatty acid polyesters, the physical, flavor release, and organoleptic properties of the chocolate products can be varied over a significant range. Generally the total amount of sucrose fatty acid polyesters present is in the range of about 10 to 35 percent, and preferably in the range of about 20 to 30 percent. When using two different sucrose fatty acid polyesters, the first sucrose fatty acid polyester is generally in the range of about 0.1 to 35 percent, preferably about 10 to 20 percent; and the second sucrose fatty acid polyester is generally in the range of about 0.1 to 35 percent, preferably about 10 to 20 percent. Preferably, the ratio of the first and second sucrose fatty acid polyesters is in the range of about 3:1 to 1:3, and more preferably in the range of about 2:1 to 1:2.

The sucrose fatty acid polyesters suitable for use in this invention are the sucrose fatty acid polyesters containing at least four fatty acid ester groups. Preferably, the fatty acid groups are long chain saturated or unsaturated aliphatic group containing between about 8 to 24 carbon atoms. Most preferably, the fatty acid groups are long chain saturated or unsaturated aliphatic group containing between about 12 to 22 carbon atoms. Especially preferred sucrose fatty acid polyesters are those containing saturated or unsaturated $C_{18}$ fatty acid groups as the predominant fatty acid group. The fatty acid groups in the sucrose fatty acid polyesters are preferably derived from fatty acids selected from the group consisting of butyric, caproic, caprylic, capric, lauric, myristic, myristoleic, palmitic, palmitoleic, stearic, oleic, ricinoleic, linoleic, oleosteric, arachidic, behenic, erucic, arachidonic, and lignoceric acids. Suitable fatty acid groups include those derived from pure fatty acids, naturally-occurring fats and oils (such as, for example, soybean, safflower, corn, canola, peanut, and cottonseed oils), or mixtures thereof, Especially preferred fatty acid groups include stearic, oleic, palmitic, and litoleic acids derived from partially hydrogenated soybean, canola, and cottonseed oils.

Suitable sucrose fatty acid polyesters can be prepared using conventional techniques. Generally, sucrose fatty acid polyesters are prepared by transesterification of sucrose with fatty acid esters or by acylation of sucrose with a fatty acid anhydride, a fatty acid chloride, or a fatty acid. For example, Rizzi et al., U.S. Pat. No. 3,963,699 (issued Jun. 15, 1976), used a solvent-free process for preparing sucrose fatty acid polyesters whereby sucrose and fatty acid esters are heated together in an inert atmosphere at or above the melting point of sucrose (about 185° C.). Akoh and Swanson, 55 *J. Food Sci.*, 236 (1990), prepared sucrose fatty acid polyesters using sucrose octaacetate in a transesterification reaction. Meyer et al., U.S. Pat. No. 4,840,815 (issued Jun. 20, 1989), and Meyer et al., PCT Publication WO 92/03060 (published Mar. 5, 1992), provided a one-stage, solvent-free, low-temperature, low-pressure process for the preparation of sucrose fatty acid polyesters which involved reacting a mixture of a lower acyl ester saccharide; a fatty acid lower alkyl ester, and an alkali metal catalyst at a reaction temperature of 100° to 125° C. while drawing a vacuum of less than about 15 torr over the reaction mixture. More recently, Hasenhuettl, U.S. patent application Ser. Nos. 08/132,106 and 08/132,497 (both filed Oct. 5, 1993) provided improved methods of preparing sucrose fatty acid polyesters via transesterification reactions. All of the just-listed patents, publications, and patent applications relating to the preparation of sucrose fatty acid polyesters are hereby incorporated by reference. Preferably, the sucrose fatty acid polyesters used in this invention are prepared from sucrose octaester by transesterification reactions with fatty acid methyl esters. Preferably, the source of the fatty acids is a mixture of fully and partially hydrogenated soybean oil which is blended in a ratio designed to target compositions in between butter fat and cocoa butter functionality.

The sucrose fatty acid polyesters used in this invention should have at least four fatty acid ester groups, preferably at least six fatty acid ester groups. The most preferred sucrose fatty acid polyesters have seven to eight fatty acid ester groups. Sucrose fatty acid polyesters prepared using the procedures outlined above generally are a mixture of sucrose fatty acid polyesters having varying degrees of esterification (i.e., different number of fatty acid ester groups). It is generally preferred, therefore, that such mixtures be treated so as to remove at least a portion of the sucrose fatty acid polyesters having relatively low numbers of fatty acid ester groups. Moreover, it is generally preferred that such mixtures of sucrose fatty acid polyesters be treated so as to increase the level of sucrose fatty acid polyesters containing eight fatty acid ester groups to at least 70 percent, and more preferably to at least 85 percent. In other words, preferably the sucrose fatty acid polyesters used in the present invention contain at least 70 percent sucrose octaesters, and more preferably at least 85 percent sucrose fatty acid octaesters. One preferred method of treating the sucrose fatty acid polyesters to increase its octaester content is fractionation using, for example, preparative chromatography with silica gel. Of course, other conventional fractionation techniques can be used to prepare the octaester-enriched fractions.

The use of such octaester-enriched fractions in the compositions of this invention generally results in chocolate products having much cleaner mouthfeel than similar chocolate product prepared with the unfractionated sucrose fatty acid polyesters or with fractions enriched in lower esters. For purposes of this invention, "cleaner mouthfeel" means that the chocolate product melts more rapidly with very little residual coating (i.e., waxiness). Thus, the chocolate products which contain octaester-enriched fractions generally have more rapid and cleaner flavor release properties.

Two different emulsifiers are used in the low- or reduced-fat chocolate products of this invention. The first emulsifier, lecithin, is normally present in conventional chocolate products. Although not wishing to be limited by theory, it appears that lecithin and the second emulsifier play significantly different roles in the chocolate compositions of this invention. Lecithin's role appears mainly to control and adjust the flow properties of the molten chocolate during processing. Thus, lecithin is used to reduce the viscosity of molten chocolate and is very important for molding and transferring operations during manufacture. Lecithin does not appear to play an important role in regard to mouthfeel. Lecithin may, however, coat the sugar and other particles in the chocolate and assist in keeping them dispersed. On the other hand, the role of the second emulsifier appears to be related to the mouthfeel properties in that it can modify the crystalline and amorphous structure of the composition. This effect reduces the waxy mouthfeel which may result from the use of higher melting point fats and sucrose fatty acid polyesters. This second emulsifier appears to generally allow use of a wider range of sucrose fatty acid polyesters and/or hydrogenated oils without a significant increase in the overall waxiness of the chocolate product. Generally the second emulsifier is selected from the group consisting of lactylated glycerides, sorbitan esters, acetylated glycerides, polysorbate esters, and polyglycerol esters. Preferred second emulsifiers include, for example, sorbitan mono- and tristearates, lactic acid esters of mono- and diglycerides, acetylated monoglycerides, polysorbate esters, and polyglycerol esters. More preferred second emulsifiers include lactic acid esters of mono- and diglycerides and sorbitan mono- and tristearates. Mixtures or blends of the various second emulsifiers can also be used. The first emulsifier is generally in the range of about 0.2 to 1.0 percent, and preferably about 0.25 to 0.5 percent. The second emulsifier is generally in the range of about 0.1 to 1.5 percent, and preferably about 0.75 to 1.0 percent. Generally, the total amount of the two emulsifiers (i.e., lecithin and the second emulsifier) is in the range of about 0.5 to 2.0 percent, and preferably about 0.75 to 1.25 percent. The weight ratio of lecithin and the second emulsifier is preferably in the range of about 1:1 to 1:4.

The compositions of this invention also contain a hydrogenated oil (i.e., a hardstock triglyceride or a stearine). Partially or fully hydrogenated oils can be used; preferably, however, the oil is fully hydrogenated. Generally, the hydrogenated oil is present at a level of about 0.5 to 3 percent, and preferably at a level of about 1.5 to 2.5 percent. Suitable hydrogenated oils include hydrogenated cottonseed oil, hydrogenated rapeseed oil, hydrogenated palm oil, hydrogenated soybean oil, and the like. The general propose of the hydrogenated oil is to adjust and improve the snap and/or firmness of the chocolate product. The desired degree or level of snap and firmness will, of course, depend on the type of chocolate product being prepared. For example, a chocolate candy bar product and chocolate ice cream sauce product should normally have very different degrees of snap and firmness. A chocolate bar is considered to have good snap when it tends to break quickly and cleanly, as opposed to bending under an applied force. Snap and firmness can be measured or estimated using conventional techniques.

Hardstock triglycerides, also generally known as stearines, are animal and vegetable oils or fats which have been hydrogenated to a brittle consistency. Generally the iodine value of such an oil or fat is less than about 20, and more preferably in the range of about 2 to 10. The stiffening capacity of such a hardened oil is generally measured by its titer (i.e., melting point). Generally, hydrogenated vegetable oils, such as hydrogenated rapeseed and cottonseed oils, having a titer greater than about 58° C. are preferred. Normally, a hydrogenated oil with a higher titer (e.g., higher titer rapeseed oil versus lower titer cottonseed oil) would be expected to have a greater effect on snap and firmness. It has been found, however, that cottonseed oil generally provides better snap in at least some of the present chocolate products than rapeseed oil. Thus, it appears that other properties in the hydrogenated oil (perhaps, for example, compatibility and crystal structure) also play significant roles in the present chocolate products. A preferred sucrose fatty acid polyester/ hydrogenated oil combination is sucrose fatty acid polyesters prepared from soybean oil and soybean stearine. Because of the high proportion of $C_{18}$ fatty acids, this polyester/hydrogenated oil combination may be especially compatible. Preferred hydrogenated oils also include cottonseed and palm oils having $C_{18}$ and $C_{16}$ fatty acids in a ratio of about 3:1. It appears that incorporation of $C_{16}$ fatty acids may provide especially suitable melting properties for the sucrose fatty acid polyesters used in the present invention.

In addition to the ingredients described above, the present compositions can also contain other ingredients normally used in chocolate products. Such additional ingredients include, for example, flavors, preservatives, colorings, color enhancers, and the like. Generally such additional ingredients are at levels less than about 3.0 percent. For example, the compositions may contain up to about 3.0 percent of a flavoring such as nut paste, hazelnut paste, caramel powder, peanut paste, vanilla, and the like.

By varying the relative proportions of the components of the chocolate products of this invention, low- or reduced-fat chocolate products having texture and mouthfeel similar to conventional chocolate products can be prepared. The variation of these ingredients— especially the sucrose fatty acid polyesters, hydrogenated oil, and emulsifiers—allows for control of mouthfeel, texture, firmness, and snap. Variations of these ingredients allows the preparation of low- or reduced-fat chocolate products having mouthfeel, texture, firmness, and snap similar to conventional chocolate products containing cocoa butter. Moreover, it is not necessary for the sucrose fatty acid polyesters to mimic the melting point and thermal properties of cocoa butter.

The chocolate products of the present invention can be prepared by combining the ingredients described above using conventional chocolate-making techniques. For example, the cocoa source, milk powder, sugar, a portion of the sucrose fatty acid polyester, and any flavor or other optional ingredients are blended together until a uniform consistency is obtained. The blended ingredients are then refined in, for example, a three roller mill, to obtain the desired particle size, which, in many cases, will be less than about 20 microns. The refined mixture is then conched in an appropriate mixer at about 60° to 80° C., preferably about 75° C. After conching for about 0.25 to 1 hour, the remaining ingredients are added (i.e., lecithin, second emulsifier, and remaining sucrose fatty acid polyester) and the conching continued for an additional 0.5 to 4 hours. The molten product can then be transferred to an appropriate chocolate mold or other container for cooling. Preferably the molten product is first cooled to ambient temperature and then refrigerated. Tempering is generally not required for the chocolate products of this invention.

The following examples are intended to further illustrate the invention and not to limit it. Percentages in the examples and throughout the specification are given in weight percent unless specified otherwise.

EXAMPLE 1

This example generally illustrates the use of sucrose fatty acid polyesters in a conventional chocolate product and is included for comparison purposes only. A hydrogenated oil and a second emulsifier were not used in the compositions of this example. The following formulations were prepared using a sucrose fatty acid polyester as a substitute for a portion of the triglyceride fat in a conventional chocolate product. Different commercial cocoa preparations were used in order to achieve increasing substitution levels for the cocoa butter. The maximum substitution was achieved with a defatted cocoa powder with less than 1 percent cocoa butter. The amount of cocoa in each formula was adjusted to maintain a constant level of cocoa solids in the final product. Two sucrose fatty acid polyester preparations —both considered to be "soft"—were used. The first "soft" sucrose fatty acid polyester was used only in composition 1A; the second "soft" sucrose fatty acid polyester was used in all remaining compositions (1B, 1C, 1D, and 1E).

The "soft" sucrose fatty acid polyesters were prepared by transesterification of sucrose octaester using fatty acid methyl ester derived from blends of fully and partially hydrogenated soybean oil. The second sucrose fatty acid polyester, which was somewhat harder than the first, was prepared with a greater proportion of fully hydrogenated soybean oil fatty acid methyl ester. The solid fat content (SFC) of the two sucrose fatty acid polyester (as well as, for comparative purposes, butter and cocoa fat) were determined by NMR at various temperatures:

| | SFC (%) | | | |
|---|---|---|---|---|
| Temp. (°C.) | First SPE | Second SPE | Butter | Cocoa Fat |
| 10 | 61.2 | 63.0 | 45.0 | 88.3 |
| 21 | 39.2 | 41.2 | 15.0 | 61.8 |
| 27 | 19.2 | 22.6 | 9.2 | 7.5 |
| 33 | 2.5 | 7.1 | 3.4 | 0 |
| 37.8 | 1.0 | 2.3 | 0 | 0 |
| 41 | 0.9 | 1.9 | 0 | 0 |

The following chocolate products, each containing about 29 percent total oleaginous components (i.e., fat, emulsifier, and sucrose fatty acid polyester) were prepared. (In this, and the following examples, "sucrose fatty acid polyester" is often abbreviated as "SPE.")

| | Sample Number: | | | | |
|---|---|---|---|---|---|
| | 1A | 1B | 1C | 1D | 1E |
| Cocoa Source: | Liquor | Liquor | Powder | Powder | Powder |
| Fat in Cocoa: | 50% | 50% | 22–24% | 10–12% | <1% |
| SPE (% of Fat): | 48% | 71% | 87% | 91% | 93% |
| Part I: | % | % | % | % | % |
| Cocoa | 13.3 | 13.3 | 8.6 | 7.4 | 6.7 |
| Flavor Ingred. | 2.2 | 2.2 | 2.2 | 2.2 | 2.2 |
| Milk Powder | 14.0 | 14.0 | 14.0 | 14.0 | 14.0 |
| Sugar | 49.5 | 49.5 | 49.5 | 49.5 | 49.5 |
| Sucrose Polyester | 4.0 | 10.5 | 15.2 | 16.4 | 17.1 |
| Cocoa Butter | 6.5 | 0 | 0 | 0 | 0 |
| Part II: | | | | | |
| Sucrose Polyester | 10.0 | 10.0 | 10.0 | 10.0 | 10.0 |
| Lecithin | 0.5 | 0.5 | 0.5 | 0.5 | 0.5 |

All ingredients in Part I were combined and blended in a food processor until a uniform consistency was obtained. The mixture was refined in a three roller mill to a particle size of less than 20 μm. The refined mixture was conched using a water-jacketed sigma-blade mixer (Brabender) heated to 75° C. The refined mixture was added first to the conch and mixed dry for about 0.5 hours. The Part II ingredients were then added and conching continued for about 0.5 to 1.5 hours. The molten product was transferred to chocolate molds, cooled to ambient temperature, and then refrigerated. No other tempering protocol was used.

Sample 1A was the softest product, although it had the best flavor. It was difficult to remove from the mold. It had the consistency of semi-melted chocolate. Sample 1B was firmer than 1A, but was still too soft and lacked snap. It melted cleanly in the mouth with only slight waxiness and had a pleasant flavor. Samples 1C, 1D, and 1E were more difficult to process. They did not flow as well as 1A or 1B during conching. They were darker in color, waxy, soft, and chewy. In general, each of these products exhibited two significant defects: (1) increased waxiness as total triglyceride content decreased and (2) excessive softness with lack of snap.

Similar compositions containing, in addition, either a hydrogenated oil or a second emulsifier (but not both) also had significant defects and were generally unacceptable. For example, compositions prepared using the second emulsifier (but no hydrogenated oil) were generally too waxy and mouthcoating to be acceptable. Compositions prepared using the hydrogenated oil (but no second emulsifier) generally were too slow melting to be acceptable; in addition, these compositions during processing tended to be very thick and difficult to mold.

EXAMPLE 2

In this example, blends of higher esteren-riched factions of both hard and soft sucrose fatty acid polyesters were used to obtain chocolate compositions of the present invention having firmness with minimal waxiness. The enriched fractions were prepared using preparative silica gel chromatography using hexane as the eluting solvent. After removal of the solvent, the enriched fractions consisted mainly of sucrose heptaesters and sucrose octaesters. The solid fat content (SFC) of the enriched fraction used was determined using NMR:

| Temp (°C.) | SFC (%) | |
|---|---|---|
| | Soft SPE | Hard SPE |
| 10 | 55.3 | 69.5 |
| 21 | 28.1 | 56.9 |
| 27 | 9.8 | 43.3 |
| 33 | 2.8 | 24.1 |
| 37.8 | 2.0 | 8.7 |

A hardstock triglyceride (cottonseed stearine) was used to improve snap and a blend of emulsifiers were used to improve melt and dispersibility properties.

In addition, this example illustrates the use of several different emulsifiers used alone. The basic formulation is given below:

| Ingredient | Percent |
|---|---|
| Part I: | |
| Cocoa (22–24% Fat) | 8.6 |
| Flavor Ingredients | 2.2 |
| Milk Powder | 14.0 |
| Sugar | 47.0 |
| Hard SPE | 10.7 |
| Part II: | |
| Soft SPE | 14.0 |
| Cottonseed Stearine | 2.5 |
| Emulsifier | 1.0 |

The following emulsifiers were used:

| Sample | Emulsifier |
|---|---|
| 2A | Lecithin (Yelkin SS, ADM Ross and Rowe Lecithins) |
| 2B | Sorbitan Monostearate (Famodan MSK, Grinsted) |
| 2C | Sorbitan Tristearate (Famodan TSK, Grinsted) |
| 2D | Lactic Acid Esters of Mono- & Diglycerides (Lactodan LW, Grinsted) |
| 2E | Lactic Acid Esters of Mono- & Diglycerides (Lactodan LW, Grinsted) |
| 2F | Polysorbate 60 (Tween 60, ICI Americas) |

Thus, each sample contained only one emulsifier and are included for comparison purposes. Inclusion of lecithin in each of samples 2B–2F would, however, provide compositions of the present invention. Since lecithin is used mainly as a processing aid in chocolate manufacture, the generally desirable mouthfeel properties of samples 2B–2F (as described below) would be retained in compositions further containing or incorporating lecithin.

Generally the same processing methods as described in Example 1 were used in this present example. The ingredients in Part I were combined and blended in a food processor until a uniform consistency was obtained. The mixture was then refined in a three roller mill to a particle size of less than about 20 microns. Small batches (about 100 to 300 grams) of the refined mixture were then conched at about 75° C. for about 0.5 hour using a water-jacketed beaker with a propeller-type mixer. The Part II ingredients (fully melted) were then added to the beaker and conching was continued for an additional about 0.5 to 1 hour. The molten product was then transferred to a chocolate mold, cooled to room temperature, and then refrigerated. No other tempering procedure was used. In general, these products were somewhat thick and difficult to mold.

Sample 2A made using only lecithin was waxy and melted slowly in the mouth. The other samples (2B–2F) prepared with the other emulsifiers were less waxy and melted more rapidly in the mouth. With the exception sample 2F (which was slightly bitter), the samples prepared with the other emulsifiers (samples 2B–2E) had a rich chocolate taste and good flavor release. Both firmness and snap were evaluated using a TA-XT-2 Texture Analyzer (Texture Technologies Corp.). Firmness was measured using a 60° cone penetrometer at 5 mm/sec for a total depth of 3 mm; snap was measured using a 3-point bend test at 1 mm/sec for a 5 mm total distance. The following results were obtained and compared to a cocoa butter product (no SPE, hardstock, or second emulsifier) and a commercial chocolate bar (Hershey's):

| Sample | Firmness (kg) | Force to Snap (kg) | Distance to Snap (mm) |
|---|---|---|---|
| 2A | 0.88 | 0.20 | 1.80 |
| 2B | 1.13 | 0.63 | 0.95 |
| 2C | 1.20 | 0.39 | 0.68 |
| 2D | 1.19 | 0.54 | 0.72 |
| 2E | 1.19 | 0.67 | 0.62 |
| 2F | 0.78 | 0.36 | 1.03 |
| Cocoa Butter Product | 2.01 | 0.73 | 0.58 |
| Hershey Bar | 1.48 | 0.89 | 1.23 |

The sorbitan stearates (samples 2B and 2C) and the lactic acid esters (samples 2D and 2E) both resulted in significant increases in firmness as compared to the lecithin-containing composition (sample 2A). The best combination of firmness and snap were found using the lactic acid esters (samples 2D and 2E); these samples required the most force with the least bending before fracture. As can also be seen, the firmness and snap of samples 2B–2E are similar to, although somewhat lower, than that of a conventional chocolate bar. As noted above, incorporation of lecithin in samples 2B–2F would improve processability without significant modification of mouthfeel and physical properties of the resulting chocolate products.

EXAMPLE 3

This example illustrates the preparation of Sample 2D from Example 2 using both lecithin and the second emulsifier. As noted in Example 2, chocolate compositions prepared with only the second emulsifier (i.e., samples 2B–2F prepared without lecithin) were generally thick and difficult to mold. This problem can be eliminated by incorporating lecithin along with the second emulsifier. Sample 2D from Example 2 was essentially repeated (but incorporating lecithin) using the following formulation:

| Ingredient | Percent |
| --- | --- |
| Part I: | |
| Cocoa (22–24% Fat) | 8.5 |
| Flavor Ingredients | 2.2 |
| Milk Powder | 13.8 |
| Sugar | 46.4 |
| Hard SPE | 10.6 |
| Part II: | |
| Soft SPE | 14.75 |
| Cottonseed Stearine | 2.5 |
| Lecithin | 0.25 |
| Second Emulsifier | 1.0 |

The second emulsifier was a lactic acid ester of mono/diglycerides (Lactodan LW, Grinsted). The chocolate product was prepared in the same manner as Example 2.

The addition of lecithin significantly improved the flowability and moldabilty of the chocolate mass. The final product had a rich chocolate taste and good flavor release properties as well as good firmness and snap. The firmness and snap were acceptable, although somewhat lower than Sample 2D prepared without lecithin:

| Sample | Firmness (kg) | Force to Snap (kg) | Distance to Snap (mm) |
| --- | --- | --- | --- |
| with lecithin | 0.78 | 0.38 | 1.2 |
| without lecithin (2D) | 1.19 | 0.54 | 0.72 |

Similar results are also expected upon the addition of lecithin to Samples 2B–2F of Example 2. In other words, the addition of lecithin to Samples 2B–2F containing a second emulsifier is expected to provide improved processing without significantly affecting mouthfeel or other physical properties of the final chocolate product.

EXAMPLE 4

In this example, the effect of various hardstocks on the organoleptic properties of the resulting chocolate products was evaluated. The basic formulations were as follows:

| Ingredient | Percent |
| --- | --- |
| Part I: | |
| Cocoa (22–24% Fat) | 8.6 |
| Flavor Ingredients | 2.2 |
| Milk Powder | 14.0 |
| Sugar | 47.0 |
| Hard SPE | 10.7 |
| Part II: | |
| Soft SPE | 14.75 |
| Hardstock | 1.5 |
| Lecithin | 0.25 |
| Second Emulsifier | 1.0 |

The second emulsifier was a lactic acid ester of mono- and diglycerides (Lactodan LW, Grinsted). The hard and soft SPEs were the same as used in Examples 2 and 3. The relative proportions of the various ingredients are essentially the same as in Example 3 except for a reduction in the amount of hardstock used in this example. The following hardstocks were used:

| Sample | Hardstock |
| --- | --- |
| 4A | Fully hydrogenated cottonseed oil |
| 4B | Fully hydrogenated rapeseed oil (high erucic) |
| 4C | Fully hydrogenated menhaden oil |
| 4D | Fully hydrogenated palm oil |
| 4E | Fully hydrogenated soybean oil |
| 4F | Fully hydrogenated canola oil |

Samples were processed as described in Examples 2 and 3. The reduction in the level of hardstock (1.5 percent in the present example as compared to 2.5 percent in Examples 2 and 3) generally resulted in a softer finished product with a creamier mouthfeel. The chocolate products 4A–4F were evaluated in regard to organoleptic properties using a trained panel. The following specific results were obtained:

| Sample | Sheen | Melt | Flavor | Mouthfeel | Mouthcoating |
| --- | --- | --- | --- | --- | --- |
| 4A | dull | quick | clean | slight waxy | slight |
| 4B | shiny | very slow | poor release | waxy | very sticky |
| 4C | shiny | quick | off-flavor | slight waxy | slight |
| 4D | shiny | quick | clean | not waxy | slight |
| 4E | shiny | slow | very clean | slight waxy | slight |
| 4F | most shiny | slow | poor release | waxy | slight |

All products were judged acceptable. The better chocolate products were, however, obtained using cottonseed, palm, and soybean oils (i.e., samples 4A, 4D, and 4E). Sample 4D, prepared with palm oil, was considered to be the best.

That which is claimed is:

1. A reduced-fat chocolate product containing about 25 to 35 weight percent oleaginous components, said product comprising:
    (1) about 5 to 20 weight percent of a cocoa source selected from the group consisting of cocoa powder and chocolate liquor;
    (2) 0 to about 20 weight percent milk powder;
    (3) about 35 to 55 weight percent sugar or artificial sweetener with a bulking agent;
    (4) 0.1 to about 35 weight percent of a first sucrose fatty acid polyester;

(5) 0.1 to about 35 weight percent of a second sucrose fatty acid polyester, wherein the first and second sucrose fatty acid polyesters have different firmness and melting profiles;

(6) about 0.2 to 1.0 weight percent lecithin;

(7) about 0.5 to 3 weight percent of a hydrogenated oil; and (8) about 0.1 to 1.5 weight percent of an emulsifier selected from the group consisting of lactylated glycerides, sorbitan esters, acetylated glycerides, polysorbate esters, and polyglycerol esters;

wherein the total amount of the first and second sucrose fatty acid polyesters is in the range of about 10 to 35 weight percent and wherein the product has mouthfeel, texture, firmness, and snap similar to conventional chocolate products containing cocoa butter.

2. A reduced-fat chocolate product as defined in claim 1, wherein the first sucrose fatty acid polyester has a solid fat content of about 20 to 50 percent at 20° C. and about 0 to 3 percent at 37°; and wherein the second sucrose fatty acid polyester has a solid fat content of about 40 to 70 percent at 20° C. and about 3 to 12 percent at 37° C.

3. A reduced-fat chocolate product as defined in claim 2, wherein at least one of the first and second sucrose fatty acid polyesters is treated so as to contain at least 70 weight percent sucrose fatty acid octaesters.

4. A reduced-fat chocolate product as defined in claim 3, wherein the emulsifier is selected from the group consisting of sorbitan monostearates, sorbitan tristearates, lactic acid esters of monoglycerides, lactic acid esters of diglycerides, acetylated monoglycerides, polysorbate esters, and polyglycerol esters.

5. A reduced-fat chocolate product as defined in claim 4, wherein the emulsifier is selected from the group consisting of lactic acid esters of monoglycerides, lactic acid esters of diglycerides, sorbitan monostearates, and sorbitan tristearates.

6. A reduced-fat chocolate product as defined in claim 2, wherein both of the first and second sucrose fatty acid polyesters are treated so as to contain at least 70 weight percent sucrose fatty acid octaesters.

7. A reduced-fat chocolate product as defined in claim 6, wherein the cocoa source is chocolate liquor and the milk powder is non-fat milk powder.

8. A reduced-fat chocolate product as defined in claim 6, wherein the cocoa source is cocoa powder containing about 10 to 24 percent cocoa butter and the milk powder is non-fat milk powder.

9. A reduced-fat chocolate product as defined in claim 6, wherein the cocoa source is cocoa powder containing about 1 to 10 percent cocoa butter and the milk powder is non-fat milk powder.

10. A reduced-fat chocolate product as defined in claim 6, wherein the cocoa source is cocoa powder containing less than about 1 percent cocoa butter and the milk powder is non-fat milk powder.

11. A reduced-fat chocolate product as defined in claim 6, wherein the emulsifier is selected from the group consisting of sorbitan monostearates, sorbitan tristearates, lactic acid esters of monoglycerides, lactic acid esters of diglycerides, acetylated monoglycerides, polysorbate esters, and polyglycerol esters.

12. A reduced-fat chocolate product as defined in claim 11, wherein the emulsifier is selected from the group consisting of lactic acid esters of monoglycerides, lactic acid esters of diglycerides, sorbitan monostearates, and sorbitan tristearates.

13. A reduced-fat chocolate product as defined in claim 1, wherein the emulsifier is selected from the group consisting of sorbitan monostearates, sorbitan tristearates, lactic acid esters of monoglycerides, lactic acid esters of diglycerides, acetylated monoglycerides, polysorbate esters, and polyglycerol esters.

14. A reduced-fat chocolate product as defined in claim 13, wherein the emulsifier is selected from the group consisting of lactic acid esters of monoglycerides, lactic acid esters of diglycerides, sorbitan monostearates, and sorbitan tristearates.

\* \* \* \* \*